P. CIOLKOSZ.
WIRE CUTTER.
APPLICATION FILED JUNE 14, 1918.
1,280,398.
Patented Oct. 1, 1918.
2 SHEETS—SHEET 1.
Fig. 1.
Fig. 2.
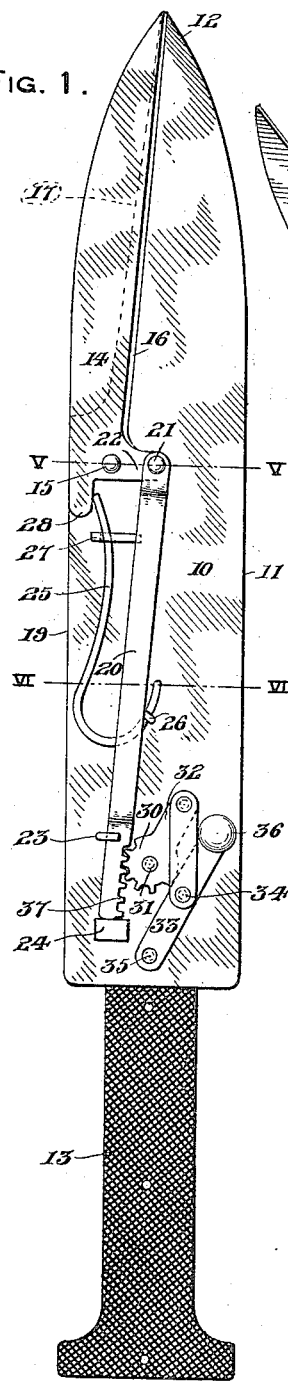
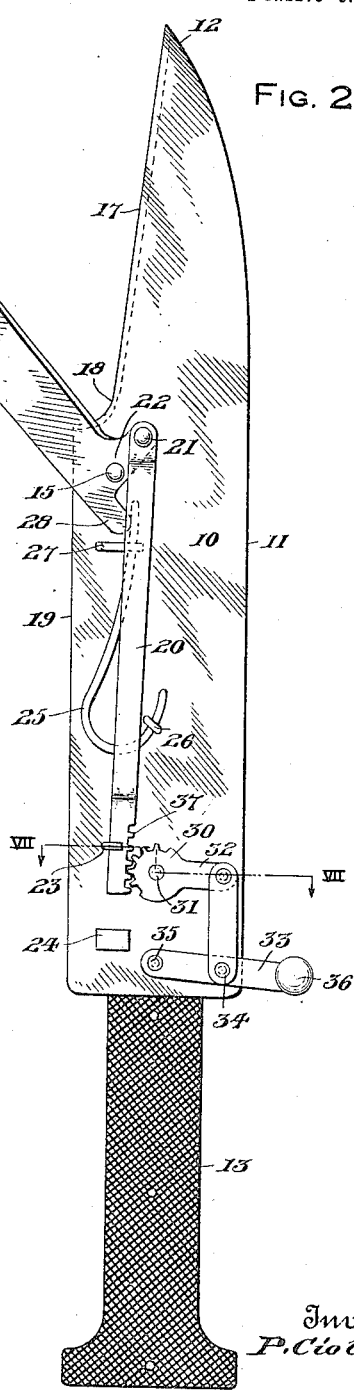
Inventor
P. Ciolkosz
By A. M. Wilson
Attorney

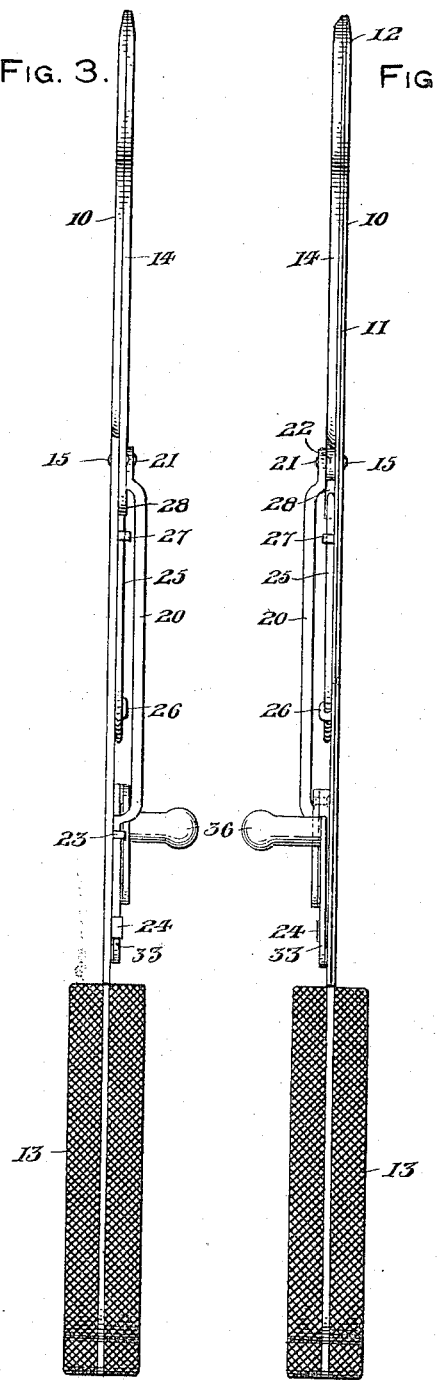
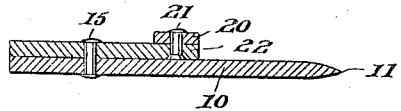
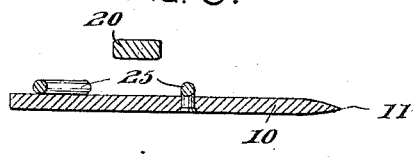
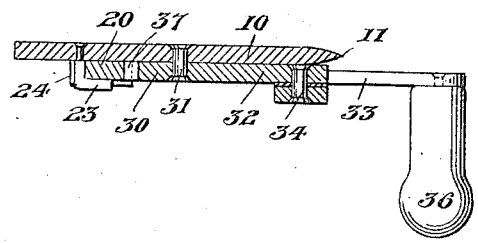

UNITED STATES PATENT OFFICE.

PIOTR CIOLKOSZ, OF CHICAGO, ILLINOIS, ASSIGNOR OF ONE-HALF TO JOHN MARCINKOWSKI, OF CHICAGO, ILLINOIS.

WIRE-CUTTER.

1,280,398. Specification of Letters Patent. Patented Oct. 1, 1918.

Application filed June 14, 1918. Serial No. 239,983.

*To all whom it may concern:*

Be it known that I, PIOTR CIOLKOSZ, a citizen of Russia, residing at Chicago, in the county of Cook and State of Illinois, have invented certain new and useful Improvements in Wire-Cutters, of which the following is a specification.

The primary object of the invention is the provision of a wire cutting device in the nature of a short sword or knife whereby a soldier might easily cut through a wire barrier or similar obstruction, the usefulness of the device being unimpaired as a knife or sword when not desired for use as a wire cutter.

A further object of the invention is to provide a knife with an adjustable blade portion whereby wires and similar articles may be readily severed simultaneously with the usual cutting operation of the knife whenever found desirable, the structure possessing great strength and durability.

In the drawings;

Figure 1 is a side elevation of the device with the wire cutter closed;

Fig. 2 is a similar view thereof in its open position;

Fig. 3 is an elevational view looking toward one edge of the device;

Fig. 4 is a similar view of the opposite edge thereof;

Figs. 5 and 6 are transverse sectional views taken upon lines V—V and VI—VI of Fig. 1; and Fig. 7 is a transverse sectional view taken upon line VII—VII of Fig. 2.

Referring more in detail to the drawings, the device broadly consists of a knife 10 having a cutting edge 11 and a pointed end 12, while a handle 13 is provided at the opposite end of the device with a swinging section or portion 14 of the blade forming means for severing wires.

The blade section 14 is pivoted as at 15 to the main blade 10 and has a cutting edge 16 adapted to coöperate with a cutting edge 17 formed at a cutaway portion 18 at the rear side 19 of the blade 10 and adjacent the point 12 thereof. An operating link 20 is pivoted as at 21 to a laterally projecting lug 22 of the section 14, the said link being outwardly bowed as shown in Figs. 3 and 4 of the drawings slidably mounted upon the blade 10 beneath a guide 23. A post 24 upon the blade 10 limits the rearward movement of the link 20, the said link being in engagement with said post when the section 14 is in its normal closed position, as illustrated in Fig. 1 of the drawings. A spring 25 is secured at one end within a loop 26 upon the blade 10 beneath the bowed portion of the link 20 with the forward free end of the spring freely extending through a guide 27 upon the blade 10 in engagement with the heel 28 of the swinging section 14. The spring 29 normally maintains the section 14 closed, automatically closing the said section when opened by the link 20 when said link is released.

A gear 30 is journaled upon a pin 31 carried by the blade 10, an arm 32 being provided for the gear pivotally connected to an operating lever 33 by means of a link 34. The lever 33 is pivoted as at 35 to the blade 10 and is provided with a projecting knob or handle 36.

When the device is closed, as illustrated in Fig. 1 of the drawings, the outline of the blade 10 is substantially interrupted and all of the mechanism is positioned upon one side of the knife. The knob 36 may be grasped and pulled rearwardly toward the handle 13 which will revolve the gear 30 which is in constant mesh with the toothed portion 37 of the link 20 thereby forwardly shifting the link 20 and separating the section 14 from the main blade 10. An article such as a wire being positioned showing the cutting edges 16 and 17 may be readily severed by forwardly moving the handle 36 for closing the section 14 assisted by the spring 25. A serviceable cutter in the nature of a combined sword and pair of shears is provided serviceable under many conditions in the time of war, and it is especially noted that the point of the cutting edge 11 of the blade 10, as well as the point 12 of the knife when thrusting the same forwardly, has no tendency to open the wire cutting section 14 which maintains its closed position until the knob 36 is manually operated.

What I claim as new is:

1. A knife having a pivotal section provided with a cutting edge adapted for coöperation with the adjacent positioned edge of the knife during the cutting operation, a slidably mounted outwardly bowed operating link for said section, an automatic closing spring for said section within the bowed portion of said link, and rack and gear operating means for said link.

2. A knife having a pivotal section provided with a cutting edge adapted for coöperating with the adjacent positioned edge of the knife during the cutting operation, a slidably mounted outwardly bowed operating link for said section, an automatic closing spring for said section within the bowed portion of said link, a stop upon the blade of the knife adapted for contact by the adjacent end of the link when the movable section thereof is closed, a gear having tooth engagement with said link, an operating knob, and operative connections between the said knob and gear.

3. In combination with a knife having a cutting blade portion at one end and with a handle at its opposite end, the said blade having a cutaway portion adjacent its pointed end forming a sharpened edge at the rear of the blade, a sharpened section pivoted to said blade adjacent the cutaway portion thereof adapted for coöperation with said rear edge during the cutting of articles, an outwardly bowed link pivoted to said section and slidably mounted upon the blade having a toothed free end portion, a closing spring for the section, and a manually operated gear upon the blade meshing with the toothed portion of said link.

4. In combination with a knife having a cutting blade pointed at one end and with a handle at its opposite end, the said blade having a cutaway portion adjacent its pointed end forming a sharpened edge at the rear of the blade, a sharpened section pivoted to said blade adjacent the cutaway portion thereof adapted for coöperation with said rear edge during the cutting of articles, an outwardly bowed link pivoted to said section and slidably mounted upon the blade having a toothed free end portion, a curved spring secured to the blade within the bowed portion of the link in engagement with the adjacent end of said section, a guide loop for said spring within said bowed portion of the link, a stop post upon the blade adjacent the free end of the link in contact therewith when said section is closed, a gear journaled upon the blade in constant mesh with said toothed portion of the link, swinging means pivoted to the blade operatively connected to the gear whereby the gear is rotated in either direction during the opening and closing of said section, and a hand knob carried by said means.

In testimony whereof I affix my signature.

PIOTR CIOLKOSZ.

Copies of this patent may be obtained for five cents each, by addressing the "Commissioner of Patents, Washington, D. C."